United States Patent
Eoh et al.

(10) Patent No.: US 11,579,626 B2
(45) Date of Patent: Feb. 14, 2023

(54) METHOD OF LOCALIZATION BY SYNCHRONIZING MULTI SENSORS AND ROBOT IMPLEMENTING SAME

(71) Applicant: LG ELECTRONICS INC., Seoul (KR)

(72) Inventors: Gyuho Eoh, Seoul (KR); Jungsik Kim, Seoul (KR); Hyoungrock Kim, Seoul (KR); Dong Ki Noh, Seoul (KR); Joongtae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 16/764,377

(22) PCT Filed: May 30, 2019

(86) PCT No.: PCT/KR2019/006535
§ 371 (c)(1),
(2) Date: May 14, 2020

(87) PCT Pub. No.: WO2020/241934
PCT Pub. Date: Dec. 3, 2020

(65) Prior Publication Data
US 2021/0405649 A1   Dec. 30, 2021

(51) Int. Cl.
*G05D 1/02*   (2020.01)
*G06T 7/579*   (2017.01)

(52) U.S. Cl.
CPC .......... *G05D 1/0253* (2013.01); *G05D 1/0272* (2013.01); *G05D 1/0274* (2013.01); *G06T 7/579* (2017.01)

(58) Field of Classification Search
None
See application file for complete search history.

(56) References Cited

U.S. PATENT DOCUMENTS

| | | | |
|---|---|---|---|
| 10,582,137 B1 * | 3/2020 | Benemann | G01S 17/08 |
| 10,989,542 B2 * | 4/2021 | Zhang | G01C 21/165 |
| 10,996,072 B2 * | 5/2021 | Ma | G01C 21/367 |
| 2012/0106828 A1 | 5/2012 | Yoon et al. | |
| 2017/0136626 A1 * | 5/2017 | Wang | B25J 9/1697 |

(Continued)

FOREIGN PATENT DOCUMENTS

| | | | |
|---|---|---|---|
| JP | 2019053391 A | * | 4/2019 |
| KR | 20120046974 | | 5/2012 |

(Continued)

*Primary Examiner* — Hunter B Lonsberry
*Assistant Examiner* — Paysun Wu
(74) *Attorney, Agent, or Firm* — Lee, Hong, Degerman, Kang & Waimey PC

(57) ABSTRACT

Disclosed herein are a method of localization by synchronizing multi sensors and a robot implementing the same. The robot according to an embodiment includes a controller that, when a first sensor acquires first type information, generates first type odometry information using the first type information, that, at a time point when the first type odometry information is generated, acquires second type information by controlling a second sensor and then generates second type odometry information using the second type information, and that the robot by combining the first type odometry information and the second type odometry information.

18 Claims, 10 Drawing Sheets

(56) References Cited

U.S. PATENT DOCUMENTS

2018/0149753 A1    5/2018   Shin et al.
2018/0204338 A1    6/2018   Narang et al.
2018/0307232 A1   10/2018   Myeong

FOREIGN PATENT DOCUMENTS

| KR | 20180117879 | 10/2018 |
| KR | 20180118500 | 10/2018 |
| KR | 20190045006 | 5/2019 |

\* cited by examiner

METHOD OF LOCALIZATION BY SYNCHRONIZING MULTI SENSORS AND ROBOT IMPLEMENTING SAME

CROSS-REFERENCE TO RELATED APPLICATIONS

This application is the National Stage filing under 35 U.S.C. 371 of International Application No. PCT/KR2019/006535, filed on May 30, 2019, the contents of which are all hereby incorporated by reference herein in their entirety.

TECHNICAL FIELD

The present disclosure relates to a method of localization by synchronizing multi sensors and a robot implementing the same.

BACKGROUND

A large-scale retail store, a department store, an airport, a golf course, and the like are places where exchange of goods and services takes place between people. Robots may be useful in the places to offer information or convenience to people.

Robots may be classified as guide robots, security robots, cleaning robots and the like. The robots move in a space, confirming their positions.

The robots are required to holding information on a space, on their current positions, on a path previously moved by the robots and the like such that the robots move confirming their positions and avoiding obstacles.

The robots may store maps to confirm a space and to move in the space. To generate a map, the robots may draw up a map using a variety of sensors, and may match and store various pieces of information in the map.

Additionally, after the robots store a map, comparison between information of the map and information acquired by the robots during movement of the robots is required to localize the robots using the map. That is, the robots may perform localization in which a position of a robot is estimated as a result of comparison between the information of the map and the information acquired by the robots during movement of the robots.

When multiple sensors are used to enhance accuracy of localizing the robot, it takes time to use information acquired by the sensors for localization. In this case, when it takes a long time to use the information for localization or when there is a difference in time between the sensors, accuracy of localization may be reduced. Accordingly, there is a growing need for a method of resolving the above-described problem.

DISCLOSURE

Technical Problems

The present disclosure enables a robot to perform localization on the basis of various types of sensors.

Additionally, the present disclosure enables a robot to calculate candidate positions of the robot on the basis of information generated by each sensor and to estimate a final position of the robot using the candidate positions.

Further, the present disclosure may enhance accuracy of localization by reducing or correcting a gap between a time period taken by any one sensor to process information acquired by any one sensor and a time period taken by another sensor to process information acquired by another sensor, among sensors of the robot.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims

Technical Solutions

A robot performing localization by synchronizing multi sensors according to an embodiment includes a controller that, when a first sensor acquires first type information, generates first type odometry information using the first type information, that, at a time point when the first type odometry information is generated, acquires second type information by controlling a second sensor and then generates second type odometry information using the second type information, and that localizes the robot by combining the first type odometry information and the second type odometry information.

The robot performing localization by synchronizing multi sensors according to an embodiment further includes a wheel encoder that generates wheel odometry information by combining information on rotations of wheels constituting a moving unit or information on directions of the wheels, and the controller generates first type odometry information and second type odometry information using wheel odometry information generated by the wheel encoder.

In the robot performing localization by synchronizing multi sensors according to an embodiment, the first sensor is a 2-dimensional LiDAR sensor and the second sensor is a camera sensor, the 2-dimensional LiDAR sensor generates a LiDAR frame periodically, the controller generates LiDAR odometry information using a LiDAR frame generated at time point t when the LiDAR frame is generated prior to time point t, and the controller instructs the camera sensor to generate a visual frame at time point t.

In the robot performing localization by synchronizing multi sensors according to an embodiment, the first sensor is a camera sensor and the second sensor is a 3-dimensional LiDAR sensor, the camera sensor generates a visual frame periodically, the controller generates visual odometry information using a visual frame generated at time point t when the visual frame is generated prior to time point t, and the controller instructs the LiDAR sensor to generate a LiDAR frame at time point t.

The robot performing localization by synchronizing multi sensors according to an embodiment generates first position correction matrix using first wheel odometry information and first position information at a previous time point, and the controller transforms the first position correction matrix into second position correction matrix using the first position information and using second wheel odometry information at a current point time, and the controller generates second position information by combining the second position correction matrix and the second wheel odometry information.

A method of localization by synchronizing multi sensors according to an embodiment includes: acquiring, by a first sensor of a robot, first type information required for SLAM performed by a robot, generating, by a controller of the robot, first type odometry information using the first type information when the first sensor acquires the first type information, controlling, by the controller, a second sensor of the robot at a time point when the first type odometry information is generated such that the second sensor acquires second type information required for SLAM performed by the robot, generating, by the controller, second type odometry information using the second type information, and localizing, the controller, the robot by combining the first type odometry information and the second type odometry information.

Advantageous Effects

According to embodiments of the present disclosure, a robot may estimate its position on the basis of various types of sensors.

According to embodiments of the present disclosure, a robot may calculate candidate positions of the robot on the basis of information generated by each sensor and may estimate a final position of the robot using the candidate positions.

According to embodiments of the present disclosure, the robot may enhance accuracy of localization by reducing or correcting a gap between a time period taken by any one sensor to process information acquired by any one sensor and a time period taken by another sensor to process information acquired by another sensor, among sensors of the robot.

Effects of the present disclosure are not limited to the above-described ones, and one having ordinary skill in the art to which the disclosure pertains may easily draw various effects from the configuration of the disclosure.

DETAILED DESCRIPTION

Figure 1:
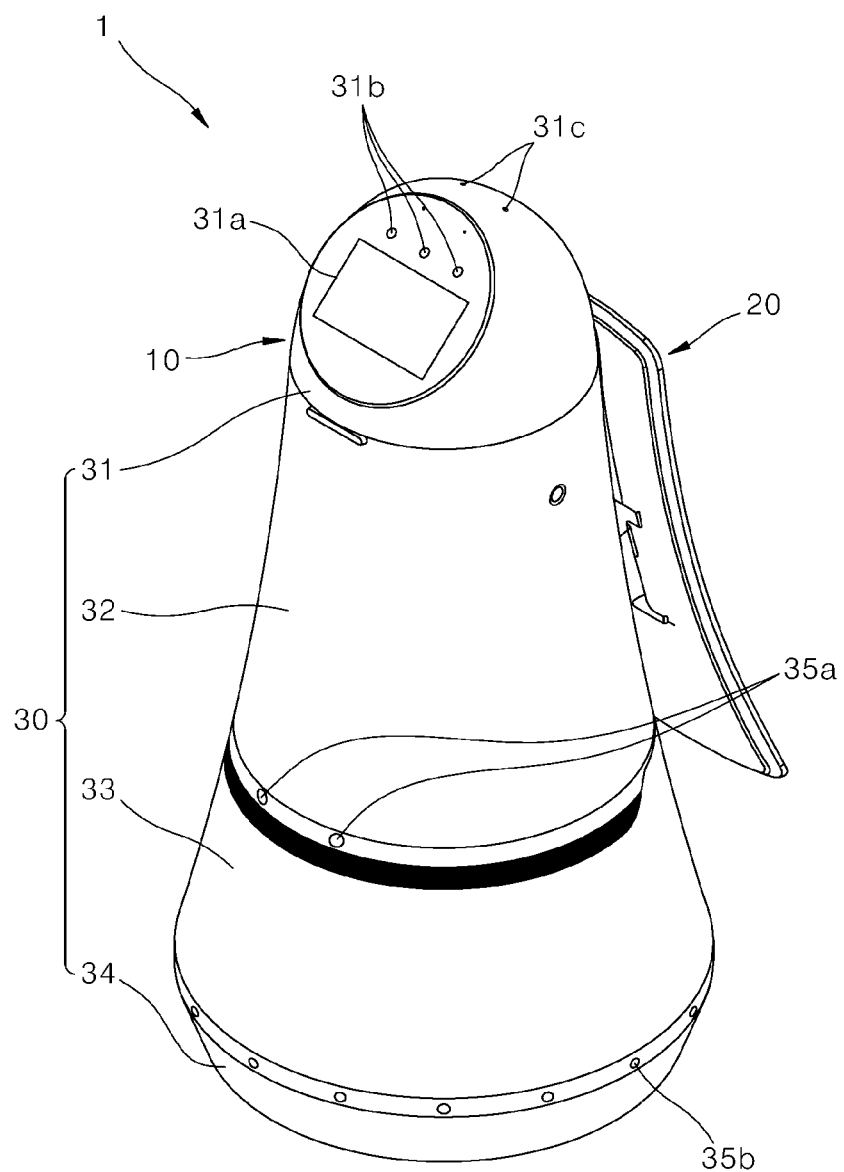
FIG. 1 shows an appearance of a robot according to an embodiment.

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), (b), and the like. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

In this specification, a robot includes devices that are used for specific purposes (cleaning, ensuring security, monitoring, guiding and the like) or that moves offering functions according to features of a space in which the robot is moving, hereunder. Accordingly, in this specification, devices that have transportation means capable of moving using predetermined information and sensors, and that offer predetermined functions are generally referred to as a robot.

In this specification, a robot may move with a map stored in it. The map denotes information on fixed objects such as fixed walls, fixed stairs and the like that do not move in a space. Additionally, information on movable obstacles that are disposed periodically, i.e., information on dynamic objects may be stored on the map.

As an example, information on obstacles disposed within a certain range with respect to a direction in which the robot moves forward may also be stored in the map. In this case, unlike the map in which the above-described fixed objects are stored, the map includes information on obstacles, which is registered temporarily, and then removes the information after the robot moves.

Further, in this specification, the robot may confirm an external dynamic object using various sensors. When the robot moves to a destination in an environment that is crowded with a large number of pedestrians after confirming the external dynamic object, the robot may confirm a state in which waypoints to the destination are occupied by obstacles.

Furthermore, the robot may determine the robot arrives at a waypoint on the basis of a degree in a change of directions of the waypoint, and the robot moves to the next waypoint and the robot can move to destination successfully.

FIG. 1 shows an appearance of a robot according to an embodiment. FIG. 1 shows an exemplary appearance. The robot may be implemented as robots having various appearances in addition to the appearance of FIG. 1. Specifically, each component may be disposed in different positions in the upward, downward, leftward and rightward directions on the basis of the shape of a robot.

A main body 10 may be configured to be long in the up-down direction, and may have the shape of a roly poly toy that gradually becomes slimmer from the lower portion toward the upper portion, as a whole.

The main body 10 may include a case 30 that forms the appearance of the robot 1. The case 30 may include a top cover 31 disposed on the upper side, a first middle cover 32 disposed on the lower side of the top cover 31, a second middle cover 33 disposed on the lower side of the first middle cover 32, and a bottom cover 34 disposed on the lower side of the second middle cover 33. The first middle cover 32 and the second middle cover 33 may constitute a single middle cover.

The top cover 31 may be disposed at the uppermost end of the robot 1, and may have the shape of a hemisphere or a dome. The top cover 31 may be disposed at a height below the average height for adults to readily receive an instruction from a user. Additionally, the top cover 31 may be configured to rotate at a predetermined angle.

The robot 1 may further include a control module 150 therein. The control module 150 controls the robot 1 like a type of computer or a type of processor. Accordingly, the control module 150 may be disposed in the robot 1, may perform functions similar to those of a main processor, and may interact with a user.

The control module 150 is disposed in the robot 1 to control the robot during robot's movement and by sensing objects around the robot. The control module 150 of the robot may be implemented as a software module, a chip in which a software module is implemented as hardware, and the like.

A display unit 31a that receives an instruction from a user or that outputs information, and sensors, for example, a camera 31b and a microphone 31c may be disposed on one side of the front surface of the top cover 31.

In addition to the display unit 31a of the top cover 31, a display unit 20 is also disposed on one side of the middle cover 32.

Information may be output by all the two display units 31a, 20 or may be output by any one of the two display units 31a, 20 according to functions of the robot.

Additionally, various obstacle sensors (220 in FIG. 2) are disposed on one lateral surface or in the entire lower end portion of the robot 1 like 35a, 35b. As an example, the obstacle sensors include a time-of-flight (TOF) sensor, an ultrasonic sensor, an infrared sensor, a depth sensor, a laser sensor, and a LiDAR sensor and the like. The sensors sense an obstacle outside of the robot 1 in various ways.

Additionally, the robot in FIG. 1 further includes a moving unit that is a component moving the robot in the lower end portion of the robot. The moving unit is a component that moves the robot, like wheels.

The shape of the robot in FIG. 1 is provided as an example. The present disclosure is not limited to the example. Additionally, various cameras and sensors of the robot may also be disposed in various portions of the robot 1. As an example, the robot of FIG. 1 may be a guide robot that gives information to a user and moves to a specific spot to guide a user.

The Robot in FIG. 1 may also include a robot that offers cleaning services, security services or functions. The robot may perform a variety of functions. However, in this specification, the focus is on a guide robot for convenience of description.

In a state in which a plurality of the robots in FIG. 1 are disposed in a service space, the robots perform specific functions (guide services, cleaning services, security services and the like). In the process, the robot 1 may store information on its position, may confirm its current position in the entire space, and may generate a path required for moving to a destination.

The robot in FIG. 1 may denote a machine capable of automatically handling assignments or capable of automatically operating, using capabilities held by the robot. Specifically, the robot that recognizes environments, makes its own decisions and performs operations may be referred to as an intelligent robot.

Robots may be classified as industrial robots, medical robots, domestic robots, military robots and the like depending on specific purposes or fields.

The robot may be provided with a driving unit including an actuator or a motor to perform various physical operations such as movements of robot joints and the like. Additionally, a mobile robot includes wheels, a brake, a propeller and the like in a driving unit to navigate on the ground or in the air through the driving unit.

Figure 2:
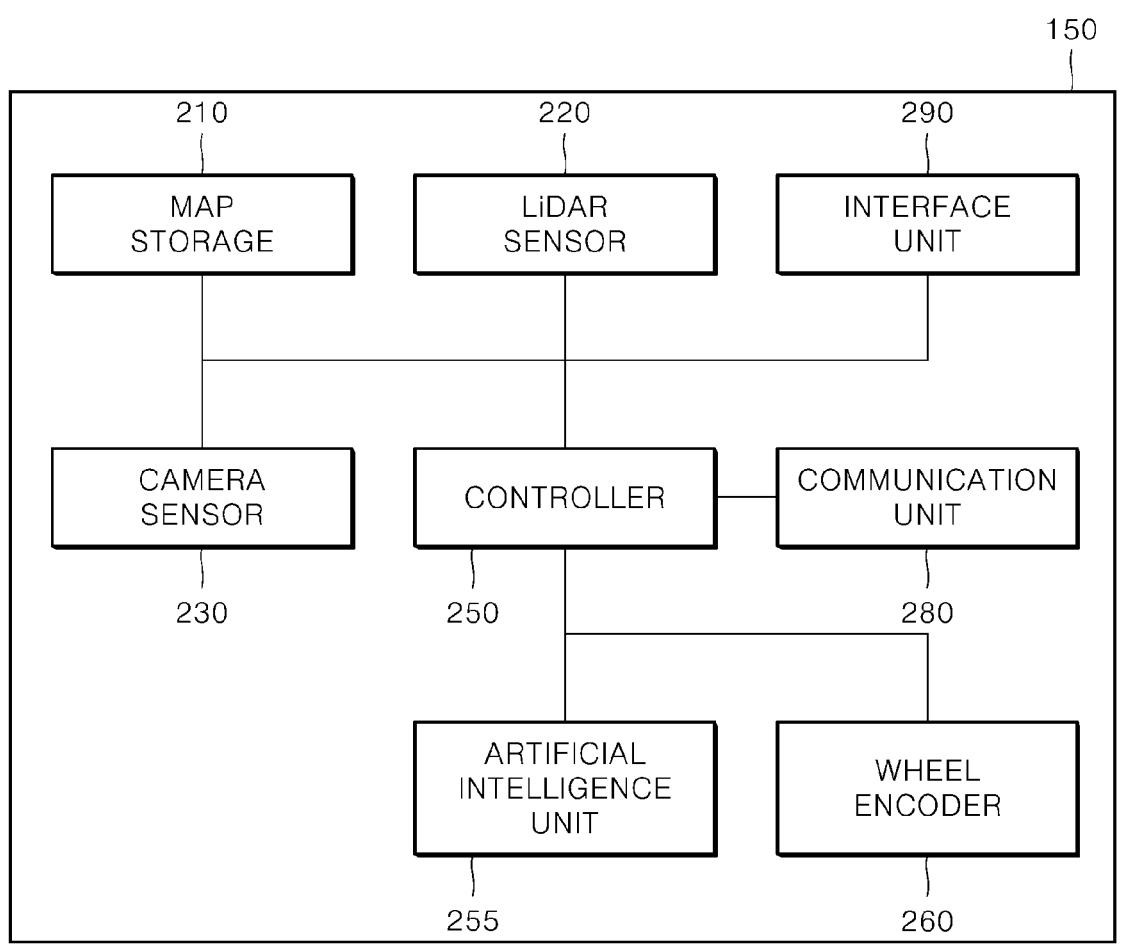
FIG. 2 shows components of a control module of a robot according to an embodiment.

FIG. 2 shows components of a control module of a robot according to an embodiment.

The robot may perform both of the functions of generating a map and estimating a position of the robot using the map.

Alternately, the robot may only offer the function of generating a map.

Alternately, the robot may only offer the function of estimating a position of the robot using the map. Below, the robot of the present disclosure usually offers the function of estimating a position of the robot using the map. Additionally, the robot may offer the function of generating a map or modifying a map.

A LiDAR sensor 220 may sense surrounding objects two-dimensionally or three-dimensionally. A two-dimensional LiDAR sensor may sense positions of objects within 360-degree ranges with respect to the robot. LiDAR information sensed in a specific position may constitute a single LiDAR frame. That is, the LiDAR sensor 220 senses a distance between an object disposed outside the robot and the robot to generate a LiDAR frame.

As an example, a camera sensor 230 is a regular camera. To overcome viewing angle limitations, two or more camera sensors 230 may be used. An image captured in a specific position constitutes vision information. That is, the camera sensor 230 photographs an object outside the robot and generates a visual frame including vision information.

The robot 1, to which the present disclosure is applied, performs fusion-simultaneous localization and mapping (Fusion-SLAM) using the LiDAR sensor 220 and the camera sensor 230.

In fusion SLAM, LiDAR information and vision information may be combinedly used. The LiDAR information and vision information may be configured as maps.

Unlike a robot that uses a single sensor (LiDAR-only SLAM, visual-only SLAM), a robot that uses fusion-SLAM may enhance accuracy of estimating a position. That is, when fusion SLAM is performed by combining the LiDAR information and vision information, map quality may be enhanced.

The map quality is a criterion applied to both of the vision map comprised of pieces of vision information, and the LiDAR map comprised of pieces of LiDAR information. At the time of fusion SLAM, map quality of each of the vision map and LiDAR map is enhanced because sensors may share information that is not sufficiently acquired by each of the sensors.

Additionally, LiDAR information or vision information may be extracted from a single map and may be used. For example, LiDAR information or vision information, or all the LiDAR information and vision information may be used for localization of the robot in accordance with an amount of memory held by the robot or a calculation capability of a calculation processor, and the like.

An interface unit 290 receives information input by a user. The interface unit 290 receives various pieces of information such as a touch, a voice and the like input by the user, and outputs results of the input. Additionally, the interface unit 290 may output a map stored by the robot 1 or may output a course in which the robot moves by overlapping on the map.

Further, the interface unit 290 may supply predetermined information to a user.

A controller 250 generates a map as in FIG. 4 that is described below, and on the basis of the map, estimates a position of the robot in the process in which the robot moves.

A communication unit 280 may allow the robot 1 to communicate with another robot or an external server and to receive and transmit information.

The robot 1 may generate each map using each of the sensors (a LiDAR sensor and a camera sensor), or may generate a single map using each of the sensors and then may generate another map in which details corresponding to a specific sensor are only extracted from the single map.

The map of the present disclosure may include odometry information on the basis of rotations of wheels. The odometry information is information on distances moved by the robot, which are calculated using frequencies of rotations of a wheel of the robot, a difference in frequencies of rotations of both wheels of the robot, and the like. A wheel encoder 260 in FIG. 2 collects information such as information on rotations or directions and the like of wheels constituting the moving unit of the robot to generate odometry information, and supplies the odometry information to the controller 250. The controller 250 may calculate a distance of movement, or a direction of movement and the like on the basis of the information supplied by the wheel encoder 260.

The robot may calculate a distance moved by the robot on the basis of the odometry information as well as the information generated using the sensors.

The controller 250 in FIG. 2 may further include an artificial intelligence unit 255 for artificial intelligence work and processing.

A plurality of LiDAR sensors 220 and camera sensors 230 may be disposed outside of the robot 1 to identify external objects.

In addition to the LiDAR sensor 220 and camera sensor 230 in FIG. 2, various types of sensors (a LiDAR sensor, an infrared sensor, an ultrasonic sensor, a depth sensor, an image sensor, a microphone, and the like) are disposed outside of the robot 1. The controller 250 collects and processes information sensed by the sensors.

The artificial intelligence unit 255 may input information that is processed by the LiDAR sensor 220, the camera sensor 230 and the other sensors, or information that is accumulated and stored while the robot 1 is moving, and the like, and may output results required for the controller 250 to determine an external situation, to process information and to generate a moving path.

As an example, the robot 1 may store information on positions of various objects, disposed in a space in which the robot is moving, as a map. The objects include a fixed object such as a wall, a door and the like, and a movable object such as a flower pot, a desk and the like. The artificial intelligence unit 255 may output data on a path taken by the robot, a range of work covered by the robot, and the like, using map information and information supplied by the LiDAR sensor 220, the camera sensor 230 and the other sensors.

Additionally, the artificial intelligence unit 255 may recognize objects disposed around the robot using information supplied by the LiDAR sensor 220, the camera sensor 230 and the other sensors. The artificial intelligence unit 255 may output meta information on an image by receiving the image. The meta information includes information on the name of an object in an image, a distance between an object and the robot, the sort of an object, whether an object is disposed on a map, and the like.

Information supplied by the LiDAR sensor 220, the camera sensor 230 and the other sensors is input to an input node of a deep learning network of the artificial intelligence unit 255, and then results are output from an output node of the artificial intelligence unit 255 through information processing of a hidden layer of the deep learning network of the artificial intelligence unit 255.

The controller 250 may calculate a moving path of the robot using date calculated by the artificial intelligence unit 255 or using data processed by various sensors.

Figure 3:
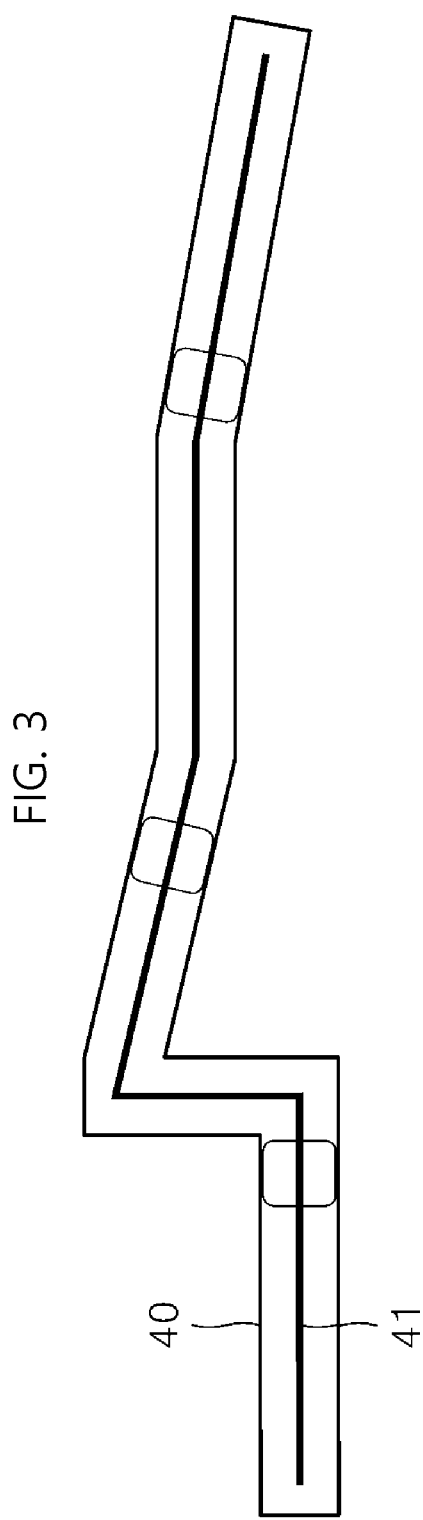
FIG. 3 shows a process in which a robot moves in a space.

The robot in FIG. 2 may perform any one or more of the above-described functions of generating a map and estimating a position while the robot is moving using the map. FIG. 3 shows an example of a space in which the robot in FIG. 2 generates a map, or estimates a position using a map.

FIG. 3 shows a process in which a robot moves in a space. The robot in the space 40 may move along a line indicated by reference No. 41, and may store information, sensed by the LiDAR sensor in a specific spot, in a map storage 210 using the LiDAR sensor 220. A basic shape of a space 40 may be stored as a local map.

Additionally, the robot may store information sensed by the camera sensor in a specific spot, in the map storage 210 using the camera sensor 230 while the robot is moving in the space 40.

Further, the robot may move in the space of FIG. 3, and the robot confirms current position by comparing stored information in the map storage 210.

Figure 4:
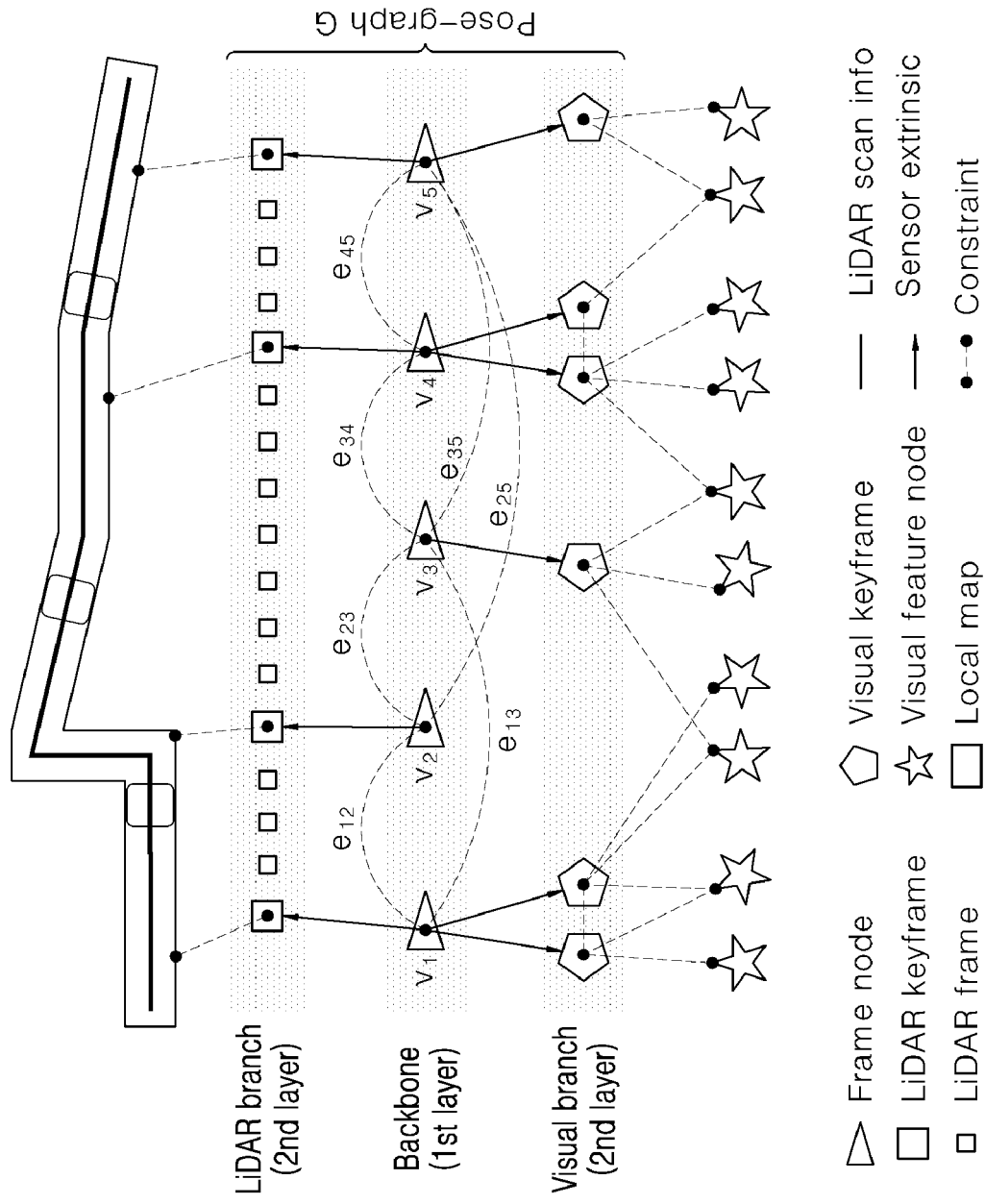
FIG. 4 shows a multiple structure of a map according to an embodiment.

FIG. 4 shows a multiple structure of a map according to an embodiment. FIG. 4 shows a double-layer structure in which a backbone is a first layer, and a LiDAR branch and a visual branch are respectively a second layer. The structure as in FIG. 4 is referred to as a structurally elastic pose graph-based SLAM.

The backbone is information on a trajectory of the robot. Additionally, the backbone includes one or more frame nodes corresponding to the trajectory. The frame nodes further include constraint information in a relation between the frame nodes and other frame nodes. An edge between nodes denotes constraint information. The edge denotes odometry constraint information (odometry constraint) or loop constraint information (loop constraint).

The LiDAR branch of the second layer is comprised of LiDAR frames. The LiDAR frames include a LiDAR sensing value that is sensed while the robot is moving. At least one or more of the LiDAR frames are set as a LiDAR keyframe.

The LiDAR keyframe has a corresponding relation with the nodes of the backbone. In FIG. 4, nodes v1, v2, v4, and v5 of the backbone indicate a LiDAR keyframe among nodes v1 to v5 of the backbone.

The visual branch of the second layer is comprised of visual keyframes. The visual keyframes indicate one or more visual feature nodes that are camera sensing values (i.e., an image captured by the camera) sensed while the robot is moving. The robot may generate a plurality of visual feature nodes on the basis of the number of camera sensors disposed in the robot.

In the map structure of FIG. 4, the LiDAR keyframe or the visual keyframe is connected to the frame node of the backbone. Certainly, the LiDAR/visual keyframe may all be connected to a single frame node (v1, v4, and v5).

Poses of the robot at the LiDAR or the visual keyframe are same, and the LiDAR or the visual keyframe is connected with each frame node. An extrinsic parameter may be added for each keyframe on the basis of a position of the robot, to which the LiDAR sensor or the camera sensor is attached. The extrinsic parameter denotes information on a relative position at which a sensor is attached from the center of the robot.

The visual keyframe has a corresponding relation with the node of the backbone. In FIG. 4, nodes v1, v3, v4, and v5 of the backbone indicate a visual keyframe among nodes v1 to v5 of the backbone. In FIG. 2, a pair of visual feature nodes (visual frames), comprised of two visual feature nodes, denote that the robot 1 captures an image using two camera sensors 230. There is an increase and a decrease in the number of visual feature nodes in each position on the basis of an increase and a decrease in the number of camera sensors 230.

Edges are displayed between nodes v1 to v5 constituting the backbone of the first layer. e12, e23, e34, and e45 are edges between adjacent nodes, and e13, e35, and e25 are edges between non-adjacent nodes.

Odometry constraint information, or for short, odometry information denotes constraints between adjacent frame nodes such as e12, e23, e34, and e45. Loop constraint information, or for short, loop information denotes constraints between non-adjacent frames such as e13, e25, and e35.

The backbone is comprised of a plurality of keyframes. The controller 250 may perform an initial mapping process to add the plurality of keyframes to the backbone. The initial mapping process includes adding the LiDAR keyframe and the visual frame based on the keyframe.

The structure of FIG. 4 is briefly described as follows. The LiDAR branch includes one or more LiDAR frames. The visual branch includes one or more visual frames.

Additionally, the backbone includes two or more frame nodes in which any one or more of a LiDAR frame or a visual frame are registered. In this case, the LiDAR frame or the visual frame registered in the frame node is referred to as a keyframe. A pose graph includes the LiDAR branch, the visual branch and the backbone.

Further, the pose graph includes odometry information, loop information and the like among frame nodes. The odometry information includes information on rotations, directions, and the like of wheels, which is generated while the robot is moving between frames nodes. The loop information is based on a set of frame nodes connected using specific constraints between visual keyframes around a specific frame node within a maximum sensing distance of the LiDAR sensor 220.

The controller 250 generates the pose graph in FIG. 4. The controller 250 stores the LiDAR branch, the visual branch, the backbone, the odometry information between frame nodes, and the pose graph including the premises in the map storage 210.

As described above, the pose graph as in FIG. 4 may be generated by the robot offering the function of generating a map and may be stored in a map storage 210 of all robots offering the function of driving.

That is, the map storage 210 stores a LiDAR branch including a plurality of LiDAR frames comparable with a first LiDAR frame acquired by the LiDAR sensor 220. Additionally, the map storage 210 stores a visual branch including a plurality of visual frames comparable with a first visual frame acquired by the camera sensor 230.

The map storage 210 stores a pose graph including a backbone including two or more frame nodes registered with any one or more of the stored LiDAR frames or the stored visual frames. Furthermore, the map storage 210 stores odometry information between the frame nodes.

The pose graph in FIG. 4 may be used for estimation of a position by the robot 1 even when any one of the camera sensor 230 and the LiDAR sensor 220 can operate. Alternately, the robot 1 may use another sensor and may enhance accuracy of estimating a position when any one sensor among sensors of the robot has low accuracy or when a plurality of positions are detected in response to information acquired by any one sensor.

For example, the robot 1 including one or more camera sensors 230 and one or more LiDAR sensors 220 may estimate a position using information acquired by multi sensors during fusion-SLAM. The robot 1 may estimate a position when any one of the results of estimation of positions that are estimated using each sensor is true.

Alternately, the robot 1 may estimate a position using information of each sensor, stored in the map storage 210, even when only some of the sensors of the robot 1 can operate or even when the robot 1 includes any one sensor. When a single LiDAR sensor 220 is used, the LiDAR sensor 220 covers 360 degrees.

Additionally, when all the sensors of the robot 1 operate, the controller 250 may control sensing time of sensors and may adjust a time point of each sensor's acquiring information or a time point of each sensor's processing the acquired information.

Considering time taken by each sensor to acquire and process data, the robot 1 may resolve the problem of synchronization that occurs when the robot performs localization using various sensors.

Pieces of information that is required when the robot 1 performs fusion SLAM using multiple sensors are described. Wheel odometry (WO) is information that is calculated based on information on rotations, directions, speeds, and the like of wheels, acquired by the wheel encoder 260.

Visual odometry (VO) is information calculated using visual data acquired by the camera sensor 230. LiDAR odometry (LO) is information calculated using LiDAR data (LiDAR scan data) acquired by the LiDAR sensor 220.

When the robot processes the WO, the VO, and the LO, time taken by each sensor to acquire and process data may vary depending on the type of each of the sensors (220, 230, and 260) and features of data generated by the sensors.

Accordingly, when the sensors acquire information at the time of being synchronized and matched, the sensors may perform optimal localization. To synchronize the sensors, odometry information is acquired by applying a difference in frequencies of the WO, the LO, the VO. Additionally, the controller 250 may combine a previously optimized pose with the WO and may draw a current position during an unsynchronized section.

The controller 250 may perform SLAM without dependency to processing speed of algorithm in each sensor. The controller 250 controls the sensors by considering time taken by the sensors to acquire or process data when using multi sensors, thereby enhancing accuracy of localization.

The robot 1 performs two-step SLAM. First, in a front-end step, the robot 1 acquires sensor information and generates information (e.g., image features and the like) required for SLAM based on the acquired information. Next, in a back-end step, the robot 1 collects pieces of information acquired in the front-end step, creates an optimized map, and estimates a position of the robot.

Herein, time taken to perform the front-end step may significantly differ depending on which sensor is used in the front-end step, i.e., depending on the type or resolution of a sensor. For example, when the robot 1 uses a 3D LiDAR sensor, the front-end step takes a large amount of time to be performed. When the robot 1 uses a 2D LiDAR sensor, the front-end step takes a small amount of time to be performed. An amount of time taken by the camera sensor 230 may be approximately halfway between the time taken by the 3D sensor and the time taken by the 2D sensor.

The robot 1 may adjust a time point of each sensor's performing the front-end step during synchronization of various types of sensors using the length of time taken by each sensor to perform the front-end step.

That is, the robot 1 applies a different length of time taken by each sensor to perform the front-end step to implement multi sensor-based fusion SLAM. As a result, the controller 250 may adjust a time point when each sensor performs the front-end step or may match a time point when each sensor finishes the front-end step.

Additionally, the controller 250 may estimate a position of the robot by reflecting that a pose of the robot 1 has not been updated during performance of the back-end step. For example, the controller 250 may confirm the robot 1's movement occurring in the back-end step in wheel odometry information and may apply the robot 1's movement at the time of localization.

Below, a detailed process of synchronizing sensors considering features in time taken by sensors to acquire and process data is described.

Figure 5:
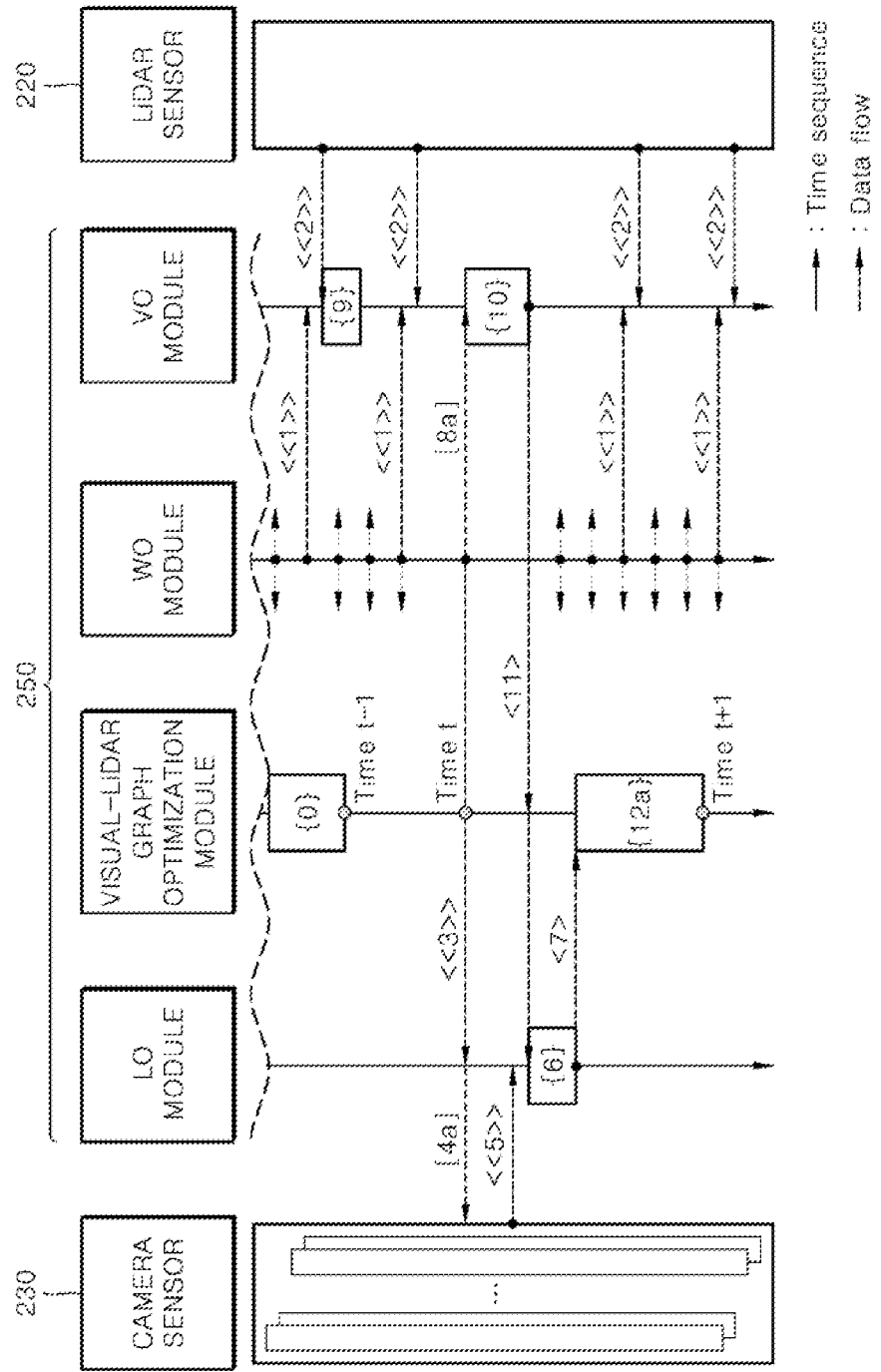
FIG. 5 shows a process of performing synchronization between a LiDAR sensor and a camera sensor according to an embodiment.

FIG. 5 shows a process of performing synchronization between a LiDAR sensor and a camera sensor according to an embodiment.

FIG. 5 may be applied to a case in which time taken by the LiDAR sensor 220 to acquire or process data is shorter than time taken by the camera sensor 230. FIG. 5 may be applied to a case in which time spent on LO is shorter than time spent on VO. For example, the LiDAR sensor 220 in FIG. 5 is a 2D LiDAR sensor.

The controller 250 in FIG. 5 may be classified as a module performing visual odometry, a module performing visual-LiDAR graph optimization, a module performing wheel odometry, and a module performing LiDAR odometry. The modules may be a module including software or hardware constituting the controller 250. Alternately, for example, the modules may be a function in software of the controller 250.

In FIG. 5, Reference No. <<1>> and Reference No. <<3>> indicate a dataflow of wheel odometry information acquired by the wheel encoder 260. Reference No. <<1>> is an example in which wheel odometry information is applied to LiDAR odometry, and Reference No. <<3>> is an example in which wheel odometry information is applied to visual odometry.

Reference No. <<2>> denotes data acquired by the LiDAR sensor 220, i.e., LiDAR scan data. The controller 250 may compare the LiDAR scan data with a LiDAR frame or a LiDAR keyframe in FIG. 4.

Reference No. <<5>> denotes data acquired by the camera sensor 230, i.e., one or more image data (or visual frames). The controller 250 may compare the image data with a visual keyframe or a visual feature node in FIG. 4.

Reference No. [4a] is a message in which the module, performing visual-LiDAR graph optimization, of the controller 250 requests the module performing VO to capture an image.

Reference No. [8a] is a message in which the module, performing visual-LiDAR graph optimization, of the controller 250 requests the module performing LO to generate incremental and loop constraint information using LiDAR scan data.

Reference No. {6} is a process in which the VO module performs Visual 3D point estimation using the images provided by the camera sensor 230 in <<5>>, and generates incremental and loop constraint information.

Reference No. {9} is a process in which the LO module generates LiDAR incremental constraint information using the scan data provided by the LiDAR sensor 220 in «2».

Reference No. {10} is a process in which the LO module generates LiDAR incremental and loop constraint information using the scan data provided by the LiDAR sensor 220 in <<2>> and the wheel odometry information provided by the WO module.

Reference No. <7> is a process of delivering the visual incremental constraint information and 3D points generated by the VO module in the process of {6} to the visual-LiDAR graph optimization module.

Reference No. <11> is a process of delivering LiDAR incremental and loop constraint information generated by the LO module in the process of {10} to the visual-LiDAR graph optimization module.

Reference No. {12} is a process in which the visual-LiDAR graph optimization module performs localization on the basis of the information provided in <7> and <11>. Reference No. {12} is an example of visual-LiDAR back-end optimization.

FIG. 5 shows a process in which the VO module starts the process of {6} at the time point when LiDAR scan data of the LiDAR sensor 220 are acquired, and, accordingly, at the time point when the LO module finishes the process of {10}. To this end, the controller 250 instructs the camera sensor 230 to acquire images at time point t (time t).

In the process of FIG. 5, the LiDAR sensor 220 and the camera sensor 230 are synchronized to a maximum degree. Accordingly, accuracy of SLAM may be enhanced.

In FIG. 5, the WO module may perform odometry calculation in a way of the wheel encoder 260, and may immediately measure information such as frequency of rotations or directions of a wheel at the hardware level. A length of time that it takes to calculate a distance or a direction of movements of the robot 1 is very short on the basis of the measured values. Thus, time taken by the WO module to perform wheel odometry and to generate a map or to estimate a position of the robot is very short.

Time taken by the VO module and the LO module to perform calculation may differ depending on features of the sensors. In FIG. 5, time taken by the LO module to perform calculation is shorter than time taken by the VO module.

Accordingly, the controller 250 controls the VO module such that the VO module starts to operate after the processing by the LO module finishes. Alternately, the controller 250 may control the VO module such that the VO module starts to operate at a specific time point before the processing by the LO module finishes. Thus, a gap between time periods taken by the two modules to perform calculation may be narrowed.

If time taken by the VO module to perform calculation is shorter than time taken by the LO module, the controller 250 controls the LO module such that the LO module starts to operate after the processing by the VO module finishes. Alternately, the controller 205 may control the LO module such that the LO module starts to operate at a specific time point before the processing by the VO module finishes. Thus, a gap between time periods taken by the two modules to perform calculation may be narrowed.

The process in FIG. 5 is briefly described as follows. The LiDAR sensor 220 generates a LiDAR frame periodically. Additionally, when a LiDAR frame is generated prior to time point t (time t) (<<2>>), the controller 250 generates LiDAR odometry information using the LiDAR frame generated at time point t ([8a], {10}).

The controller 250 instructs the camera sensor 230 to generate a visual frame at time point t (time t) ([4a]). Additionally, the controller 250 generates visual odometry information using the visual frame generated by the camera sensor 230 ({6}).

The controller 250 generates a map using the LiDAR odometry information and the visual odometry information or estimates a position of the robot ({12a}) by comparing with a stored map.

When the pose graph in FIG. 4 is applied, the controller 250 compares a LiDAR frame registered in a frame node of the pose graph with a first LiDAR frame that is acquired by the LiDAR sensor 220 while driving and generates LiDAR odometry information.

Additionally, the controller 250 compares a visual frame registered in a framed node of the pose graph with a first visual frame that is acquired by the camera sensor 230 while driving, and generates visual odometry information.

In this case, the controller 250 first generates the LiDAR odometry information. Accordingly, when generating visual odometry information, the controller 250 may use the LiDAR odometry information.

For example, the controller 250 searches for a visual frame stored in the map storage 210 to confirm a position corresponding to the first visual frame. As a result of the search, the controller 250 may search for one or more candidate positions of the robot and may confirm the one or more candidate positions from the pose graph.

In this case, because the LiDAR odometry information is generated first, to select a candidate position based on the visual frame, the controller 250 may select any one of the candidate positions of the robot using the LiDAR odometry information and may confirm the selected candidate position from the pose graph.

Figure 6:
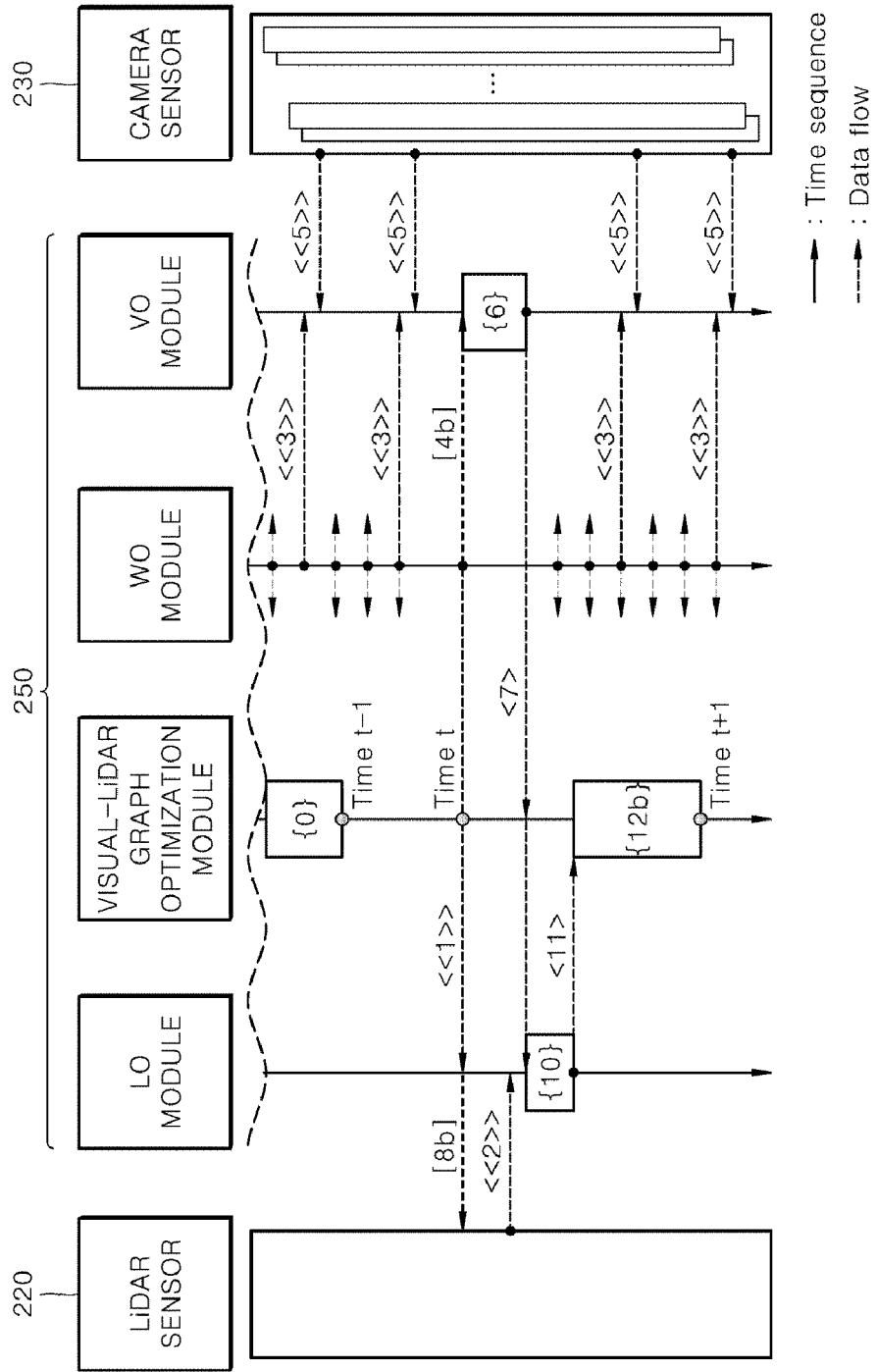
FIG. 6 shows a process of performing synchronization between a LiDAR sensor and a camera sensor according to another embodiment.

FIG. 6 shows a process of performing synchronization between a LiDAR sensor and a camera sensor according to another embodiment.

FIG. 6 may be applied to a case in which time taken by the camera sensor 230 to acquire or process data is shorter than time taken by the LiDAR sensor 220. FIG. 6 may be applied to a case in which time spent on VO is shorter than time spent on LO. For example, the LiDAR sensor 220 in FIG. 6 is a 3D LiDAR sensor.

Repetition of detailed description provided with reference to FIG. 5 is omitted. While the LiDAR sensor 220 repeats generating scan data, in FIG. 5, the camera sensor 230 repeats capturing images in FIG. 6.

Reference No. [4b] is a message in which the module, performing visual-LiDAR graph optimization, of the controller 250 requests the module performing VO to generate incremental and loop constraint information using image data.

Reference No, [8b] is a message in which the module, performing visual-LiDAR graph optimization, of the controller 250 requests the module performing LO to acquire scan data.

FIG. 6 shows a process in which the LO module starts the process of {10} at the time point when image data of the camera sensor 230 are acquired, and, accordingly, at the time point when the VO module finishes the process of {6}. To this end, the controller 250 instructs the LiDAR sensor 220 to acquire LiDAR scan data at time point t (time t).

The process in FIG. 6 is briefly described as follows. The camera sensor 230 generates a visual frame periodically. Additionally, when a visual frame is generated prior to time point t (time t) (<<5>>), the controller 250 generates visual odometry information using the visual frame generated at time point t ([4b], {6}).

The controller 250 instructs the LiDAR sensor 220 to generate a LiDAR frame at time point t (time t) ([8b]). Additionally, the controller 250 generates LiDAR odometry information using the LiDAR frame generated by the LiDAR sensor 220 ({10}).

The controller 250 generates a map using the visual odometry information and the LiDAR odometry information or localizes the robot ({12b}) by comparing with a stored map.

When the pose graph in FIG. 4 is applied, the controller 250 compares a visual frame registered in a frame node of the pose graph with a first visual frame that is acquired by the camera sensor 230 while driving, and generates visual odometry information.

Additionally, the controller 250 compares a LiDAR frame registered in a framed node of the pose graph with a first LiDAR frame that is acquired by the LiDAR sensor 220 while driving, and generates LiDAR odometry information.

In this case, the controller 250 first generates the visual odometry information. Accordingly, when generating LiDAR odometry information, the controller 250 may use the visual odometry information.

For example, the controller 250 searches for a LiDAR frame stored in the map storage 210 to confirm a position corresponding to the first LiDAR frame. As a result of the search, the controller 250 may search for one or more candidate positions of the robot and may confirm the one or more candidate positions from the pose graph.

In this case, because the visual odometry information is generated first, to select a candidate position based on the LiDAR frame, the controller 250 may select any one of the candidate positions of the robot using the visual odometry information and may confirm the selected candidate position from the pose graph.

In FIGS. 5 and 6, each of the LO module and the VO module may generate LiDAR odometry information and visual odometry information using wheel odometry information generated by the wheel encoder.

Figure 7:
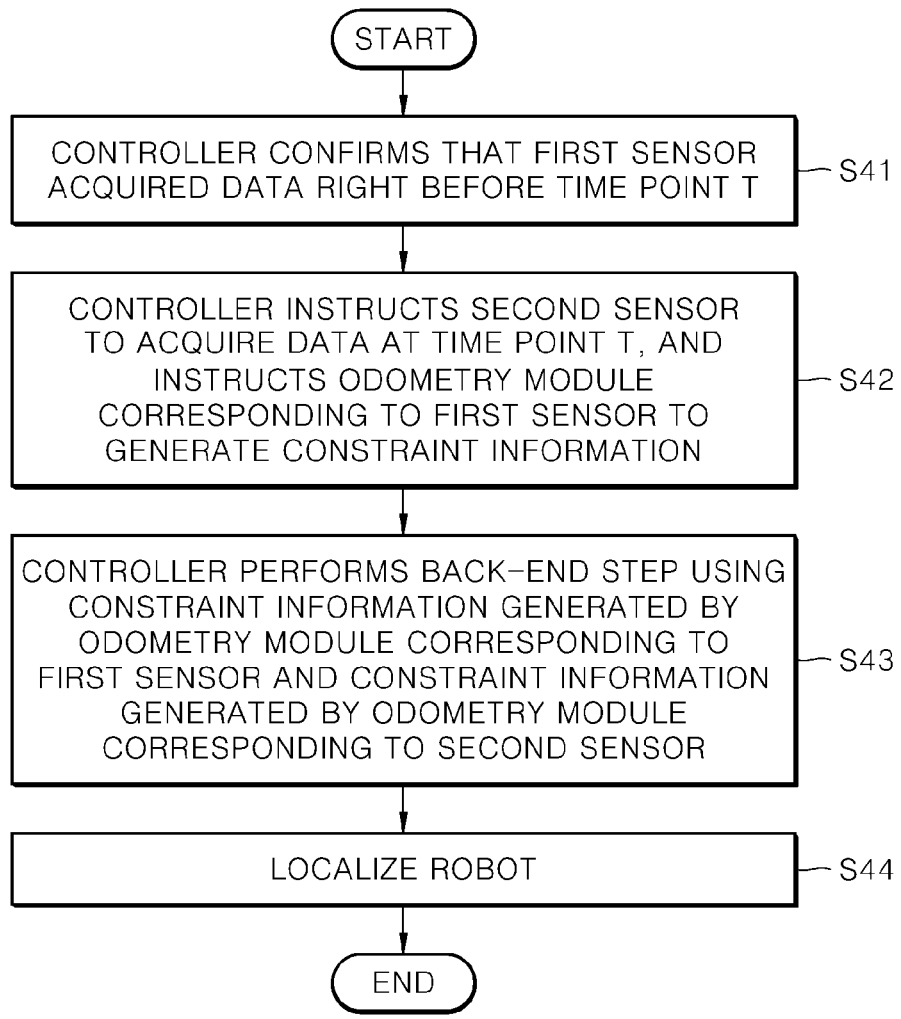
FIG. 7 shows a process of synchronizing of two types of sensors according to an embodiment.

FIG. 7 shows a process of synchronizing of two types of sensors according to an embodiment. The process in FIG. 7 may be applied to the embodiments in FIGS. 5 and 6. The robot includes two types of sensors, a first sensor acquires first type information required for SLAM performed by the robot, and a second sensor acquires second type information required for SLAM performed by the robot. Suppose that the first sensor acquires information or generates odometry information more rapidly than the second sensor.

For example, when the first sensor is a 2-dimensional LiDAR sensor as in the embodiment of FIG. 5, the second sensor may be a camera sensor. Alternately, when the first sensor is a camera sensor as in the embodiment of FIG. 6, the second sensor may be a 3-dimensional LiDAR sensor.

The controller 250 is in the state of storing data acquired by the first sensor between time point (t−1) (time t−1) and time point t (time t). For example, in the embodiment of FIG. 5, the first sensor is a LiDAR sensor 220, and the LiDAR sensor 220 performs LiDAR scanning and is in the state of storing a LiDAR frame. In the embodiment of FIG. 6, the first sensor is a camera sensor 230, and the camera sensor 230 performs image capturing and is in the state of storing a visual frame.

Additionally, the controller 250 confirms that the first sensor acquires data near time point t (S41), and instructs the second sensor to acquire data at time point t (S42). The second sensor acquires data and then delivers the data to an odometry module corresponding to the second sensor.

The controller 250 requests an odometry module corresponding to the first sensor to generate constraints required for generating a map and for performing localization at time point t (S42).

Step 42 includes operations right from time point t (time t) to the process {12} in FIGS. 5 and 6. For example, step 43 is the process {12} in FIGS. 5 and 6.

Then the controller 250 performs a back-end step using constraint information generated by the odometry module corresponding to the first sensor and constraint information generated by the odometry module corresponding to the second sensor (S44).

The robot may move during the process in which the sensors acquire data and in which the LO module and the VO module generate constraint information on the basis of the data. When the robot moves during a time period in which the front-end step and the back-end step are performed, the controller 250 estimates a position to which the robot moves in real time. To this end, the controller 250 may generate a corrected position of the robot using an optimized position (optimized pose) just prior to the movement of the robot and using wheel odometry information that is accumulated while the robot is moving after the movement of the robot.

That is, when the first sensor acquires first type information, the controller 250 generates first type odometry information using the first type information.

As an example, when the LiDAR sensor is the first sensor, the first type information is a LiDAR frame, and the first type odometry information is LiDAR odometry information.

As an example, when the camera sensor is the first sensor, the first type information is a visual frame, and the first type odometry information is visual odometry information.

Additionally, the controller 250 controls the second sensor, acquires second type information and then generates second type odometry information using the second type information at a time point when the first type odometry information is generated.

As an example, when the LiDAR sensor is the second sensor, the second type information is a LiDAR frame, and the second type odometry information is LiDAR odometry information.

As an example, when the camera sensor is the second sensor, the second type information is a visual frame, and the second type odometry information is visual odometry information.

Additionally, the controller 250 estimates a position of the robot by combining the first type odometry information and the second type odometry information. As a result, odometry information between the two sensors is synchronized at the same position or may be synchronized such that an error may be minimized.

Further, when LiDAR odometry information is generated in FIG. 5, a process in which the generated LiDAR odometry information is applied to generation of visual odometry information ({6}, <11>) may be confirmed.

When visual odometry information is generated in FIG. 6, a process in which the generated visual odometry information is applied to generation of LiDAR odometry information ({10}, <7>) may be confirmed.

As described above, the controller 250 may generate the first type odometry information of the first sensor and then may generate the second type odometry information considering the first type odometry information. As a result, the controller 250 may reduce time spent generating the second type odometry information.

The controller 250 may perform the process in FIG. 7 even when the robot moves a certain distance or more from a previous position or at a certain angle or greater. In this case, as an example, the previous position is a position that is optimized just prior to the movement of the robot and that is estimated. That is, when the robot 1 moves a certain distance (e.g., 0.5 meter) or more from a previous position or at a certain angle (e.g., 10 degrees) or greater as a result of tracking a path of movement of the robot 1 by the wheel encoder 260 of the robot 1, the controller 250 may control the first sensor and the second sensor and may generate the first type odometry information and the second type odometry information to perform SLAM.

That is, in the process {12a} in FIG. 5 or the process {12b} in FIG. 6, the controller 250 may generate a map and may perform the back-end step of estimating a position of the robot by combining the first type odometry information and the second type odometry information.

Figure 8:
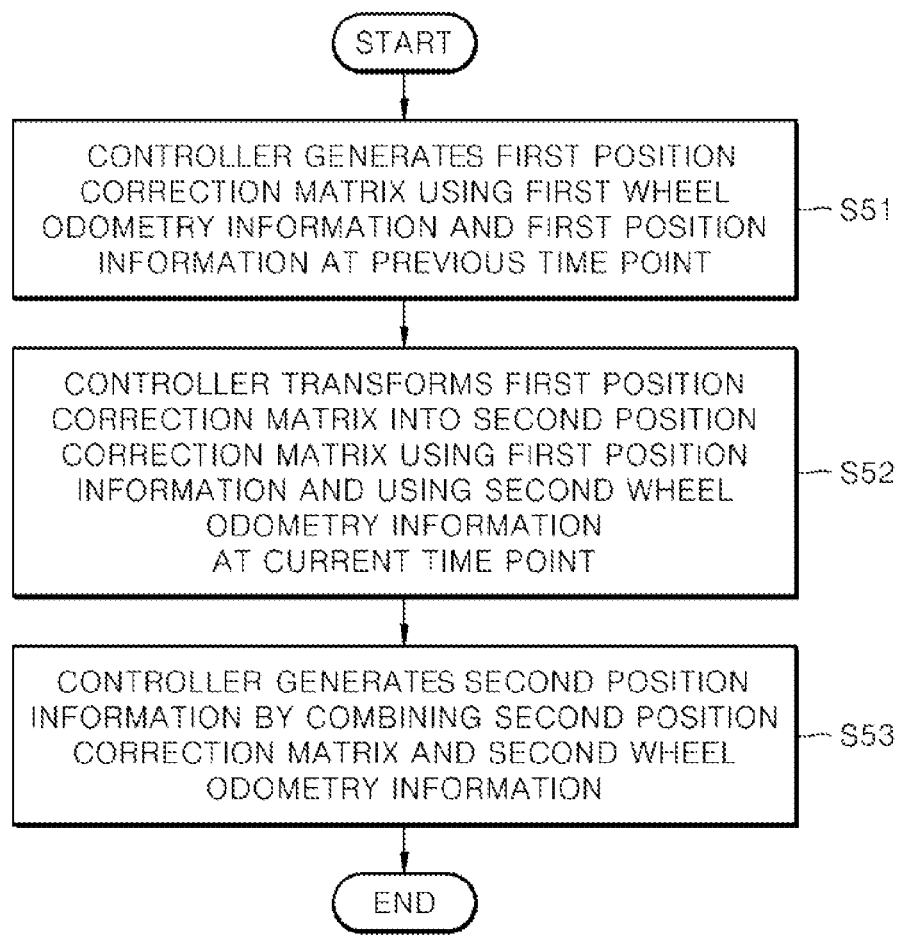
FIG. 8 shows a process in which a robot according to an embodiment corrects a position during SLAM.

FIG. 8 shows a process in which a robot according to an embodiment corrects a position during SLAM.

Description focuses on FIG. 5 or FIG. 6. A time point when results of calculation of SLAM are output is time point t−1, and time point t+1, and positional values are unlikely to be corrected between time point t−1 and time point t+1. Accordingly, the controller 250 may calculate correction transformation (CT) to correct the positional values.

The controller 250 outputs results of correction of a position in the form of transformation rather than a position (pose).

According to the process in FIG. 8, the controller 250 generates first position correction matrix ($T_{c(t)}$) using first wheel odometry information ($P_{od(t)}$) and first position information ($P_{c(t)}$) at a previous time point (t) (S51).

As in formula 1 and formula 2, the controller 250 calculates $T_{c(t)}$ that transforms an odometry position ($P_{od(t)}$) into $P_{c(t)}$ which is a corrected position (pose). $T_{c(t)}$ is matrix (correction transformation matrix) that transforms an odometry position into a corrected position, and function ⊕ to which the matrix and the odometry position ($P_{od(t)}$) are input calculates $P_{c(t)}$ which is a corrected position.

$T_{c(t)}$ calculated as in formula 2 is a result that is calculated by applying a corrected position, i.e., the first position information ($P_{c(t)}$) and the first wheel odometry position ($P_{od(t)}$) to $\ominus$ which is an inverse function (an inverse composition) of $\oplus$.

Additionally, the controller 250 transforms the first position correction matrix ($T_{c(t)}$) into second position correction matrix ($T_{c(t+1)}$) using the first position information ($P_{c(t)}$), and using second wheel odometry information ($P_{od(t+1)}$) at a current point time (S52). Specifically, as expressed in formula 3, the controller 250 generates the second position correction matrix ($T_{c(t+1)}$) using the first position information ($P_{c(t)}$) and a variation ($\Delta P_{od(t+1)}$) of the second wheel odometry information ($P_{od(t+1)}$), which is varied with respect to the first wheel odometry information.

Additionally, the controller 250 generates second position information ($P_{c(t+1)}$) using the second position correction matrix ($T_{c(t+1)}$) and a variation ($\Delta P_{od(t+1)}$) of the second wheel odometry information ($P_{od(t+1)}$) as expressed in formula 4 (S53).

For example, as in formula 3, $T_{c(t+1)}$ that is correction transformation at time point t+1 is calculated using a position at a previous time point t.

That is, the controller 250 calculates $T_{c(t)}$ in the form of matrix by inversely transforming a corrected position ($P_c$) with respect to wheel odometry.

When the controller 250 outputs a position of the robot, the controller 250 calculates a corrected position by applying wheel odometry and correction transformation matrix. As a result, the controller 250 may accurately estimate a position of the robot at any time point.

$$P_{c(t)} = T_{c(t)} \oplus P_{od(t)} \quad \text{[Formula 1]}$$

$$T_{c(t)} = P_{c(t)} \ominus P_{od(t)} \quad \text{[Formula 2]}$$

$$T_{c(t+1)} = T_{c(t)} \ominus P_{od(t+1)} = (P_{c(t)} \ominus P_{od(t)}) \oplus (P_{od(t)} \oplus (\Delta P_{od(t+1)})) = P_{c(t)} \oplus (\Delta P_{od(t+1)}) \quad \text{[Formula 3]}$$

$$P_{c(t+1)} = T_{c(t+1)} \ominus (\Delta P_{od(t+1)}) \quad \text{[Formula 4]}$$

According to the above-describe embodiment, the robot 1 may resolve the problem of synchronization of sensors, which occurs unavoidably when the robot 1 performs SLAM using a plurality of sensors of various types.

According to the above-describe embodiment, the robot 1 may resolve the problem of synchronization by reflecting difference in processing speed of algorithm caused by speeds of data acquisition and processing of each sensor and the like, or by reflecting difference in speeds caused by hardware operations.

While the robot 1 performs SLAM, each sensor may acquire information at an area with high accuracy of localization or at an area with low accuracy of localization, and the robot 1 may store the information. Additionally, the robot 1 may learn the stored information using an artificial intelligence module and may repeatedly apply the information acquired at the area with low accuracy of localization or at the area with high accuracy of localization to the pose graph.

To this end, the artificial intelligence unit 255 of the controller 250 is a type of learning processor. The artificial intelligence unit 255 may process position information cumulatively stored by the robot 1 and information acquired by sensors, and numerical values on accuracy of localization and may update the pose graph.

Artificial intelligence refers to a field of researching artificial intelligence or researching methodologies for creating artificial intelligence, and machine learning refers to a field of defining various problems in the field of artificial intelligence and researching methodologies for solving the problems. The machine learning is defined as an algorithm that improves the performance of a task through consistent experiences with the task.

An artificial neural network (ANN) is a model used in machine learning and may refer to any kind of model having a problem-solving capability, the model being composed of artificial neurons (nodes) forming a network by a combination of synapses. The ANN may be defined by a connection pattern between neurons in different layers, a learning process for updating model parameters, and an activation function for generating an output value.

The ANN may include an input layer and an output layer. Optionally, the ANN may further include one or more hidden layers. Each layer may include one or more neurons, and the ANN may include synapses for connecting the neurons. In the ANN, each neuron may output function values of the activation function associated with input signals, weights, and deflections that are received through the synapses.

The model parameters refer to parameters determined through learning and include synapse connection weights, neuron deflections, and the like. Also, hyperparameters refer to parameters to be set before learning in a machine learning algorithm and includes a learning rate, the number of repetitions, a minimum placement size, an initialization function, and the like.

The training purpose of the ANN can be regarded as determining model parameters that minimize a loss function. The loss function may be used as an index for determining an optimal model parameter during the learning process of the ANN.

The machine learning may be classified as supervised learning, unsupervised learning, or reinforcement learning depending on the learning scheme.

The supervised learning may refer to a method of training the ANN while a label for learning data is given, and the label may refer to an answer (or a result value) to be inferred by the ANN when the learning data is input to the ANN. The unsupervised learning may refer to a method of training the ANN while the label for the learning data is not given. The reinforcement learning may refer to a learning method for training an agent defined in any embodiment to select an action or a sequence of actions that maximizes cumulative reward in each state.

Machine learning implemented using a deep neural network (DNN) including a plurality of hidden layers in the ANN will be called deep learning, and the deep learning is a portion of the machine learning. In the following description, the machine learning is used as a meaning including the deep learning.

For the robot 1, the artificial intelligence unit 255 in FIG. 2 may perform an artificial intelligence function.

In this case, the communication unit 280 of the robot 1 may transmit or receive data to or from external apparatuses such as the AI server 300, which will be described in FIG. 9, or a robot for providing another artificial intelligence function through wired and wireless communication technologies. For example, the communication unit 280 may transmit or receive sensor information, user inputs, learning models, controls signals, and the like to or from external apparatuses.

In this case, the communication technology used by the communication unit 280 includes Global System for Mobile Communication (GSM), code-division multiple access (CDMA), Long Term Evolution (LTE), 5G, Wireless LAN (WLAN), Wireless-Fidelity (Wi-Fi), Bluetooth™, Radio- Frequency Identification (RFID), Infrared Data Association (IrDA), ZigBee, Near Field Communication (NFC), and the like.

The interface unit 290 may acquire various kinds of data.

In this case, the interface unit 290 may include a camera for receiving an image signal input, a microphone for receiving an audio signal, a user input unit for receiving information from a user, and the like. Here, information acquired by the LiDAR sensor 220, the camera sensor 230, or the microphone refers to sensing data, sensor information, and the like.

The interface unit 290, various kinds of sensors, the wheel encoder 260, and the like may acquire input data or the like to be used when an output is acquired using a learning model and learning data for learning a model. The aforementioned elements may acquire raw input data. In this case, the control unit 250 or the artificial intelligence unit 255 may extract an input feature as a preprocessing process for the input data.

The artificial intelligence unit 255 may train a model composed of an ANN using learning data. Here, the trained ANN may be called a learning model. The learning model may be used to infer a result value not for the learning data but for new input data, and the inferred value may be used as a determination basis for the robot 1 to perform a certain operation.

In this case, the artificial intelligence unit 255 may perform artificial intelligence processing along with the artificial intelligence unit 355 of the AI server 300.

In this case, the artificial intelligence unit 255 may include a memory integrated or implemented in the robot 1. Alternatively, the artificial intelligence unit 255 may be implemented using a separate memory, an external memory coupled to the robot 1, or a memory held in an external apparatus.

The robot 1 may acquire at least one of internal information of the robot 1, environmental information of the robot 1, and user information using various sensors.

Sensors included in the robot 1 include a proximity sensor, an illumination sensor, an acceleration sensor, a magnetic sensor, a gyroscope sensor, an inertial sensor, an RGB sensor, an infrared sensor (IR sensor), a finger scan sensor, an ultrasonic sensor, an optical sensor, a microphone, a LiDAR sensor 220, a camera sensor 230, a radar sensor and the like.

The above-described interface unit 290 may generate output in relation to vision, hearing or touch and the like.

In this case, the interface unit 290 may include a display unit outputting visual information, a speaker outputting auditory information, a haptic module outputting tactile information and the like.

A memory built in the robot 1 may store data supporting various functions of the robot 1. For example, the memory may store input data, learning data, a learning model, a learning history, and the like which are acquired by the interface unit 290 or various kinds of sensors built in the robot 1.

The control unit 250 may determine at least one executable operation of the robot 1 on the basis of information determined or generated using a data analysis algorithm or a machine learning algorithm. Also, the control unit 250 may control the elements of the robot 1 to perform the determined operation.

To this end, the control unit 250 may request, retrieve, receive, or utilize data of the artificial intelligence unit 255 or the memory and may control the elements of the robot 1 to execute a predicted operation or an operation determined as being desirable among the at least one executable operation.

In this case, when there is a need for connection to an external apparatus in order to perform the determined operation, the control unit 250 may generate a control signal for controlling the external apparatus and transmit the generated control signal to the external apparatus.

The control unit 250 may acquire intention information with respect to a user input and may determine a user's requirements based on the acquired intention information.

In this case, the controller 250 may acquire intention information corresponding to user input using at least one or more of a speech-to-text (STT) engine for transforming voice input into character strings or a natural language processing (NLP) engine for acquiring intention information of natural language.

In this case, at least part of at least one or more of the STT engine or the NLP engine may include an artificial intelligence network trained based on a machine learning algorithm. Additionally, at least one or more of the STT engine or the NLP engine may be trained by the artificial intelligence unit 255, or by the learning processor 340 of the AI server 300, or by distributed processing thereof.

The controller 250 may collect history information including details of operation of the robot 1, a user's feedback on operation of the robot and the like and may store the history information in the memory or the artificial intelligence unit 255, or may transmit the history information to an external device such as the AI server 300 and the like. The collected history information may be used to update a learning model.

The controller 250 may control at least part of components of the robot 1 to drive an application program stored in the memory 170. Further, the controller 250 may combine and operate two or more of the components included in the robot 1 to drive the application program.

Alternately, an additional artificial intelligence (AI) server communicating with the robot 1 may be provided and may process information supplied by the robot 1.

Figure 9:
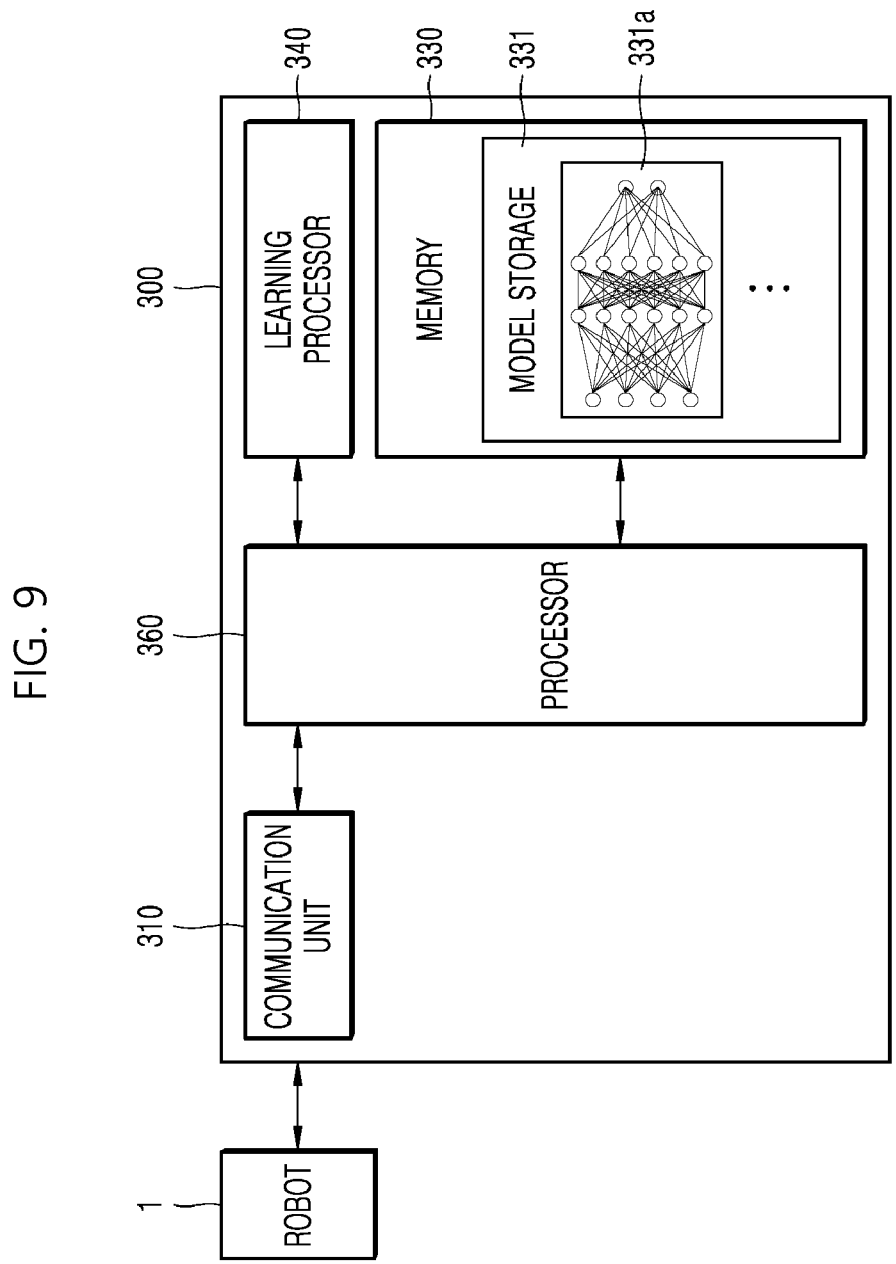
FIG. 9 shows a configuration of an AI server according to an embodiment.

FIG. 9 shows a configuration of an AI server 300 according to an embodiment. An artificial intelligence server, i.e., an AI server 300, may denote a device that trains an artificial neural network using a machine learning algorithm or that uses a trained artificial neural network. The AI server 300, which includes a plurality of servers, may perform distributed processing and may be defined as a 5G network. In this case, the AI server 300 may be included as a partial configuration of an AI device 100 and may perform at least part of AI processing together with the AI device 100.

The AI server 300 may include a communication unit 310, a memory 330, a learning processor 340 and a processor 360 and the like.

The communication unit 310 may transmit or receive data to or from an external device such as the robot 1 and the like.

The memory 330 may include a model storage unit 331. The model storage unit 331 may store a model 231a (or an artificial neural network) that is being trained or is trained through a learning processor 340.

The learning processor 340 may train the artificial neural network 331a using learning data. A learning model may be used in the state of being mounted onto the AI server 300 of the artificial neural network, or may be used in the state of being mounted onto an external device such as the robot 1 and the like.

The learning model may be implemented as hardware, software or a combination thereof. When all or part of the learning model is implemented as software, one or more instructions constituting the learning model may be stored in the memory 330.

The processor 360 may infer result values on new input data using the learning model, and may generate responses or control instructions based on the inferred result values.

Figure 10:
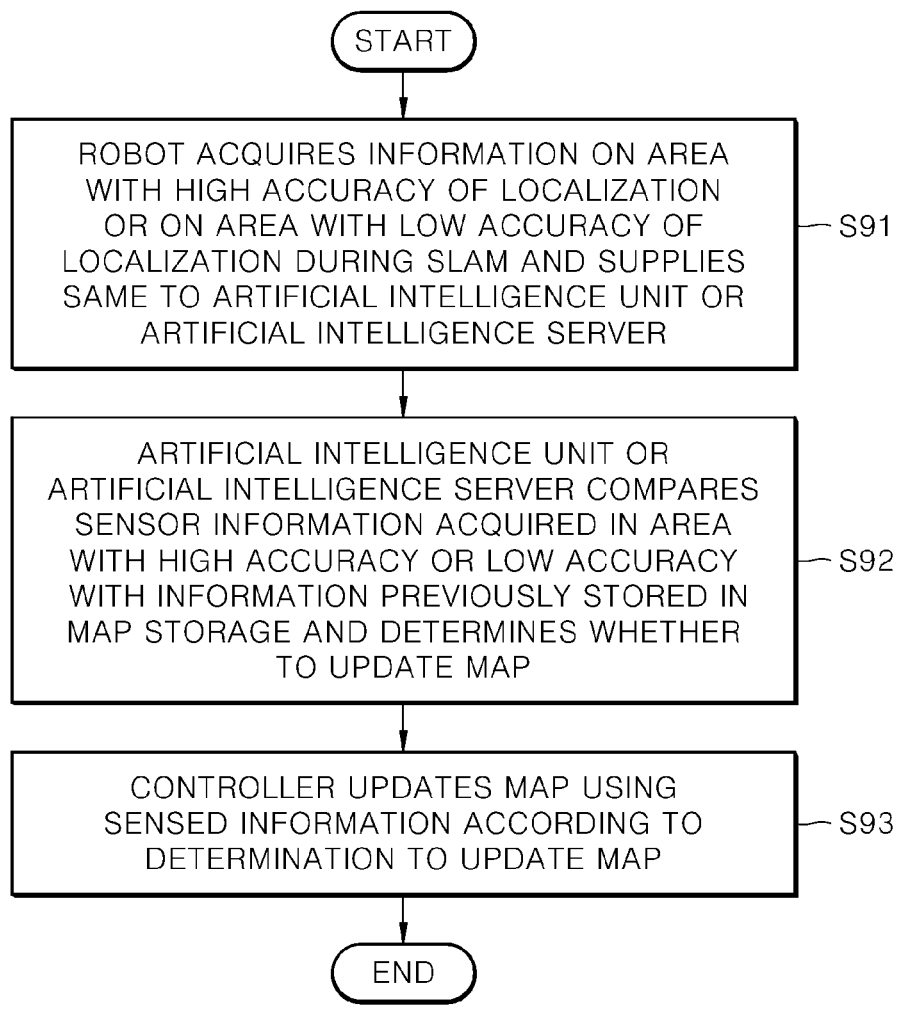
FIG. 10 shows a process in which a robot according to an embodiment updates a pose graph on the basis of artificial intelligence during SLAM.

FIG. 10 shows a process of updating a pose graph on the basis of artificial intelligence during SLAM of a robot according to an embodiment.

While performing SLAM, the robot acquires information on an area with high accuracy of localization or an area with low accuracy of localization. That is, the robot supplies information sensed by the LiDAR sensor 220 or the camera sensor 230, accuracy of localization preformed by the robot on the basis of the information, and position information to the artificial intelligence unit 255 or the AI server 300 (S91).

The artificial intelligence unit 255 or the artificial intelligence server 300 compares accuracy of pieces of information acquired by each sensor according to position information, using the supplied information. The artificial intelligence unit 255 or the artificial intelligence server 300 compares sensor information acquired at an area with high accuracy or with low accuracy with information previously stored in the map storage, and determines whether to update a map (S92).

Then the controller 250 updates the map using sensed information according to the determination to update the map (S93). As an example, the controller 250 may update a LiDAR frame/visual frame registered in the pose graph.

According to the process of FIG. 10, while the robot 1 performs SLAM, each sensor may acquire information at an area with high accuracy of localization or at an area with low accuracy of localization, and the robot 1 may store the information. Additionally, the robot 1 may learn the stored information using an artificial intelligence module and may repeatedly apply the information acquired at the area with low accuracy of localization or at the area with high accuracy of localization to the pose graph.

AI technologies may be applied to the robot 1, and the robot 1 may be implemented as a guide robot, a transportation robot, a cleaning robot, a wearable robot, an entertainment robot, a pet robot, an unmanned aerial robot, and the like.

The robot 1 may include a robot control module for controlling operations, and the robot control module may denote a software module or a chip in which a software module is implemented as hard ware.

The robot 1 may acquire its state information, may detect (recognize) a surrounding environment and a surrounding object, may generate map data, may determine a moving path and a driving plan, may determine a response to user interaction or may determine an operation, using sensor information obtained from various types of sensors.

The robot 1 may use sensor information obtained by at least one or more sensors among a LiDAR sensor, a radar sensor, and a camera sensor to determine a moving path and a driving plan.

The robot 1 may perform the above-described operations using a learning model comprised of at least one or more artificial neural networks. For example, the robot 1 may recognize a surrounding environment and a surrounding object using the learning model, and may determine an operation using information on the recognized surrounding environment or object. The learning model may be directly learned by the robot 1 or by an external device such as an AI server 300 and the like.

In this case, the robot 1 may perform operations by directly using the learning model and generating results. The robot 1 may also perform operations by transmitting sensor information to an external device such as an AI server 300 and the like and by receiving results that are generated as a result.

The robot 1 may determine a moving path and a driving plan using at least one or more of map data, object information detected from sensor information, or object information obtained from an external device, and may drive on the basis of the determined moving path and driving plan by controlling a driving unit.

Map data may include object identification information on various objects in a space in which the robot 1 moves. For example, the map data may include object identification information on fixed objects such as a wall, a door and the like, and on movable objects such as a flower pot, a desk and the like. Additionally, the object identification information may include a name, a sort, a distance, a location and the like.

Further, the robot 1 may perform operations or may perform driving by controlling the driving unit on the basis of control/interactions of a user. In this case, the robot 1 may obtain intention information on interactions according to operations of the user or utterance of voices of the user, may determine responses on the basis of the obtained intention information, and may perform operations.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

The invention claimed is:
1. A robot comprising:
   wheels configured to move the robot;
   a first sensor configured to acquire first type information for performing simultaneous localization and mapping (SLAM) by using a front-end step and a back-end step, wherein the front-end step comprises acquiring sensor information and generating information used for performing SLAM based on the acquired sensor information, wherein the back-end step comprises collecting pieces of sensor information acquired in the front-end step, creating an optimized map, and estimating a position of the robot;
a second sensor configured to acquire second type information for performing SLAM; and
a controller configured to:
generate a first type odometry information using the first type information acquired by the first sensor;
after generating the first type odometry information, generate a second type odometry information using the second type information acquired by the second sensor; and
localize the robot by combining the generated first type odometry information and the generated second type odometry information, wherein the controller is further configured to:
control the first sensor and the second sensor to perform SLAM based on lengths of time taken by the first sensor and the second sensor to acquire or process data; and
adjust a time point for when the first sensor and the second sensor perform a subsequent front-end step during synchronization of the first and second sensors using a respective lengths of time taken by the first sensor and the second sensor to perform the front-end step,
wherein the first sensor or the second sensor is a LiDAR sensor configured to sense a distance between an external object and the robot and to generate a first LiDAR frame,
wherein the second sensor or the first sensor is a camera sensor configured to capture an image of objects external to the robot and to generate a first visual frame, and
wherein the robot further comprises a map storage that is configured to store:
a LiDAR branch including a plurality of LiDAR frames comparable with the first LiDAR frame,
a visual branch including a plurality of visual frames comparable with the first visual frame,
a graph including a backbone with two or more frame nodes that are each associated with at least one of the stored LiDAR frames or the stored visual frames, and odometry information between the frame nodes,
wherein based on LiDAR odometry information being generated before visual odometry information, the controller is further configured to select any one of candidate positions of the robot using the LiDAR odometry information for selecting a candidate position based on the first visual frame, and wherein based on the visual odometry information being generated before the LiDAR odometry information, the controller is further configured to select any one of the candidate positions of the robot using the visual odometry information for selecting a candidate position based on the first LiDAR frame.

2. The robot of claim 1, wherein the first sensor is configured to acquire information more rapidly than the second sensor.

3. The robot of claim 1, wherein the robot further comprises a wheel encoder configured to generate wheel odometry information by combining information on rotations of the wheels or information on directions of the wheels, and wherein the first type odometry information and the second type odometry information are generated using the generated wheel odometry information.

4. The robot of claim 1, wherein the second type odometry information is generated based on applying the generated first type odometry information.

5. The robot of claim 1, wherein the first type odometry information and the second type odometry information are generated based on satisfying a first condition or a second condition, wherein the first condition corresponds to the robot moving past a preset distance and the second condition corresponds to the robot moving past a preset angle with respect to a forward direction of the robot.

6. The robot of claim 1, wherein the first sensor is a 2-dimensional LiDAR sensor configured to generate a LiDAR frame and the second sensor is a camera sensor, and wherein the controller is further configured to:
generate LiDAR odometry information using the generated LiDAR frame at a time point based on the LiDAR frame being generated prior to the time point,
cause the camera sensor to generate a visual frame at the time point,
generate visual odometry information using the generated visual frame generated, and
generate a map using the generated LiDAR odometry information and the generated visual odometry information, wherein the robot is localized based on comparing the generated map with a stored map.

7. The robot of claim 1, wherein the first sensor is a camera sensor configured to generate a visual frame and the second sensor is a 3-dimensional LiDAR sensor, and wherein the controller is further configured to:
generate visual odometry information using the generated visual frame at a time point based on the visual frame being generated prior to the time point,
cause the 3-dimensional LiDAR sensor to generate a LiDAR frame at the time point,
generate LiDAR odometry information using the generated LiDAR frame, and
generate a map using the generated visual odometry information and the generated LiDAR odometry information, wherein the robot is localized based on comparing the generated map with a stored map.

8. The robot of claim 1, wherein the controller is further configured to generate a map by combining the generated first type odometry information and the generated second type odometry information, and wherein localizing the robot further comprises performing the back-end step using constraint information corresponding to the first sensor and constraint information corresponding to the second sensor.

9. The robot of claim 1, wherein the robot further comprises a wheel encoder that is configured to generate wheel odometry information by combining information on rotations of the wheels or information on directions of the wheels, and wherein the controller is further configured to:
generate a first position correction matrix using a first wheel odometry information generated by the wheel encoder and a first position information at a previous time point,
transform the generated first position correction matrix into a second position correction matrix using the generated first position information and a second wheel odometry generated by the wheel encoder at a current time point, and
generate a second position information based on combining the second position correction matrix and a variation of the second wheel odometry information.

10. A method of localization by synchronizing multi sensors, comprising:
acquiring, by a first sensor of a robot, first type information for performing SLAM by using a front-end step and a back-end step, wherein the front-end step comprises acquiring sensor information and generating information used for performing SLAM based on the acquired sensor information, wherein the back-end step comprises collecting pieces of sensor information acquired in the front-end step, creating an optimized map, and estimating a position of the robot;

generating a first type odometry information using the first type information by using the first type information acquired by the first sensor;

after generating the first type odometry information, acquiring, by a second sensor of the robot, second type information for performing SLAM;

generating a second type odometry information using the second type information acquired by a second sensor;

localizing the robot by combining the generated first type odometry information and the generated second type odometry information; and controlling the first sensor and the second sensor to perform SLAM based on lengths of time taken by the first sensor and the second sensor to acquire or process data; and adjusting a time point for when the first sensor and the second sensor perform a subsequent front-end step during synchronization of the first and second sensors using a respective lengths of time taken by the first sensor and the second sensor to perform the front-end step, wherein the first sensor or the second sensor is a LiDAR sensor configured to sense a distance between an external object to the robot and the robot and to generate a first LiDAR frame, wherein the second sensor or the first sensor is a camera sensor configured to capture an image of an objects external to the robot and to generate a first visual frame, and wherein the robot further comprises a map storage that is configured to store:

a LiDAR branch including a plurality of LiDAR frames comparable with the first LiDAR frame, a visual branch including a plurality of visual frames comparable with the first visual frame, a graph including a backbone with two or more frame nodes that are each associated with at least one of the stored LiDAR frames or the stored visual frames, and odometry information between the frame nodes, wherein based on LiDAR odometry information being generated before visual odometry information, the controller is further configured to select any one of candidate positions of the robot using the LiDAR odometry information for selecting a candidate position based on the first visual frame, and based on the visual odometry information being generated before the LiDAR odometry information, the controller is further configured to select any one of the candidate positions of the robot using the visual odometry information for selecting a candidate position based on the first LiDAR frame.

11. The method of claim 10, wherein, when the first sensor is configured to acquire information more rapidly than the second sensor.

12. The method of claim 10, wherein the robot further comprises a wheel encoder configured to generate wheel odometry information by combining information on rotations of the wheels or information on directions of the wheels, and wherein the first type odometry information and the second type odometry information are generated using the generated wheel odometry information.

13. The method of claim 10, wherein the second type odometry information is generated based on applying the generated first type odometry information.

14. The method of claim 10, wherein the first type odometry information and the second type odometry information are generated based on satisfying a first condition or a second condition, wherein the first condition corresponds to the robot moving past a preset distance and the second condition corresponds to the robot moving past a preset angle with respect to a forward direction of the robot.

15. The method of claim 10, wherein the first sensor is a 2-dimensional LiDAR sensor configured to generate a LiDAR frame and the second sensor is a camera sensor, and wherein the method further comprises:
generating LiDAR odometry information using the generated LiDAR frame at a time point based on the LiDAR frame being generated prior to the time point,
causing the camera sensor to generate a visual frame at the time point,
generating visual odometry information using the generated visual frame generated, and
generating a map using the generated LiDAR odometry information and the generated visual odometry information, wherein the robot is localized based on comparing the generated map with a stored map.

16. The method of claim 10, wherein the first sensor is a camera sensor configured to generate a visual frame and the second sensor is a 3-dimensional LiDAR sensor, and wherein the method further comprises:
generating visual odometry information using the generated visual frame at a time point based on the visual frame being generated prior to the time point,
causing the 3-dimensional LiDAR sensor to generate a LiDAR frame at the time point,
generating LiDAR odometry information using the generated LiDAR frame, and
generating a map using the generated visual odometry information and the generated LiDAR odometry information, wherein the robot is localized based on comparing the generated map with a stored map.

17. The method of claim 10, the method further comprising generating a map by combining the generated first type odometry information and the generated second type odometry information, and wherein localizing the robot further comprises performing the back-end step using constraint information corresponding to the first sensor and constraint information corresponding to the second sensor.

18. The method of claim 10, wherein the robot further comprises a wheel encoder that is configured to generate wheel odometry information by combining information on rotations of the wheels that moves the robot, or information on directions of the wheels,
the method further comprising;
generating a first position correction matrix using a first wheel odometry information generated by the wheel encoder and a first position information at a previous time point,
transforming the generated first position correction matrix into a second position correction matrix using the generated first position information and a second wheel odometry generated by the wheel encoder at a current time point, and
generating a second position information based on combining the second position correction matrix and a variation of the second wheel odometry information.

* * * * *